2,827,477

TERTIARY-AMINO-LOWER-ALKYL ESTERS OF 2-ARYL-3-HYDROXYPROPANOIC ACIDS AND PREPARATION THEREOF

Frederick F. Blicke, Ann Arbor, Mich., assignor to Regents of the University of Michigan, Ann Arbor, Mich., a corporation of Michigan No Drawing. Application October 12, 1955
Serial No. 540,149

13 Claims. (Cl. 260—473)

This invention relates to alkamine esters of substituted aliphatic acids and more particularly to tertiary-amino-lower-alkyl esters of 2-aryl-3-hydroxypropanoic acids.

The improvement in such esters which constitutes the present invention comprises the substitution of such known type of esters in the 3-position of the acid moiety by a cycloalkyl or cycloalkenyl radical, preferably one having 5 or 6 ring members, which substitution has not previously been suggested and which yields compounds possessing physiological effects as anti-spasmodic agents. The double bond of the cycloalkenyl radical can be in any position relative to the point of attachment to the rest of the molecule.

The compounds of the present invention can be prepared by esterification, with the desired tertiary-amino-lower-alkyl compound, of a 2-aryl-3-hydroxy-3-cycloalkyl- or 3-cycloalkenyl-propanoic acid. The preferred method comprises heating the acid with a tertiary-aminoalkyl halide at a temperature between about 50° C. and 150° C. in a solvent which is inert under the conditions of the reaction. A hydrohalide salt of the alkamine ester is obtained which can be converted to the free alkamine ester by the addition of alkali to the reaction mixture. The intermediate acids can be prepared by reacting the halomagnesium derivative of a salt of an arylacetic acid with a cycloalkane- or cycloalkene-carboxaldehyde and hydrolyzing the so-formed intermediate organometal complex with dilute mineral acid. The reaction of the halomagnesium derivative of a salt of an arylacetic acid and the aldehyde compound is carried out in a solvent inert under the conditions of the reaction, preferably at a temperature between about 20° C. and 100° C.

The following representative examples illustrate the best mode of practicing my invention:

EXAMPLE 1

(a) *2-phenyl-3-hydroxy-3-cyclohexylpropanoic acid*

To a stirred solution of isopropylmagnesium chloride (approximately 0.44 mole, prepared from 10.7 g. (0.44 mole) of magnesium turnings and 50 cc. of isopropyl chloride) in 400 ml. of anhydrous ether was added, dropwise, a solution of 27.2 g. (0.20 mole) of phenylacetic acid in 100 ml. of anhydrous benzene. After the addition of 200 cc. of ether, the mixture was stirred and refluxed for eighteen hours. The mixture was cooled to room temperature, and a solution of 27 g. (0.24 mole) of cyclohexane-carboxaldehyde in 100 ml. of anhydrous ether was added, dropwise. The stirred mixture was refluxed for four hours, then poured into an ice-cold mixture of 60 ml. of concentrated hydrochloric acid and 500 cc. of water to bring about hydrolysis of the Grignard complex. The benzene-ether layer was separated, washed with water, and extracted with a cold aqueous solution of sodium bicarbonate. The alkaline extract was washed with ether, cooled, and acidified with concentrated hydrochloric acid. The product which separated was collected by filtration and recrystallized from carbon tetrachloride, giving 40 g. (81%) of 2-phenyl-3-hydroxy-3-cyclohexylpropanoic acid, M. P. 131–134° C.

*Analysis.*—Calcd. for $C_{15}H_{20}O_3$: C, 72.55; H, 8.12. Found: C, 72.50; H, 8.32.

Neut. equiv. calcd.: 248.3. Found: 249.1.

(b) *2-diethylaminoethyl 2-phenyl-3-hydroxy-3-cyclohexylpropanoate*

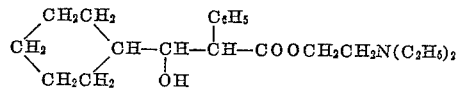

To a refluxing solution of 10 g. (0.04 mole) of 2-phenyl-3-hydroxy-3-cyclohexylpropanoic acid in about 60 ml. of isopropyl alcohol was added, dropwise, over a period of about one hour, 5.4 g. (0.04 mole) of 2-diethylaminoethyl chloride which had previously been dissolved in its own weight of anhydrous benzene. The solution was refluxed for an additional eight hours, and then filtered while hot to remove the small amount of self-condensation product of the 2-diethylaminoethyl chloride which usually formed during the course of the reaction. The cooled solution was diluted with anhydrous ether (about 60 cc.) until the product began to separate and then cooled at 0° C. for about sixteen hours. The product was collected by filtration, washed with anhydrous ether, and recrystallized from an isopropyl alcohol-methyl ethyl ketone mixture, giving 8.9 g. (58%) of 2-diethylaminoethyl 2-phenyl-3-hydroxy-3-cyclohexylpropanoate in the form of its hydrochloride salt, M. P. 171–172° C.

*Analysis.*—Calcd. for $C_{21}H_{34}O_3NCl$: C, 65.70; H, 8.93; Cl, 9.23. Found: C, 65.58; H, 8.98; Cl, 9.17.

2-diethylaminoethyl 2-phenyl-3-hydroxy-3-cyclohexylpropanoate hydrochloride was found to have an antispasmodic activity about 10% that of atropine sulfate when tested by the modified Magnus method [Luduena and Lands, J. Pharmacol. & Exptl. Therap., 110, 282 (1954)]. The $ALD_{50}$ value (approximate lethal dose in 50% of the animals) when administered intravenously to mice was 28 mg./kg. of body weight.

A portion of the 2-diethylaminoethyl 2-phenyl-3-hydroxy-3-cyclohexylpropanoate hydrochloride obtained above was converted to the free base by treatment with a slight excess of cold aqueous sodium carbonate and the free base was extracted with ether. The ether solution was dried and treated with a fourfold excess of methyl bromide at room temperature. After standing for twenty-four hours, the solution was cooled to 0° C. for from one to two days. The crystalline material which separated was collected by filtration and recrystallized from an isopropyl alcohol-ether mixture to give 2-diethylaminoethyl 2-phenyl-3-hydroxy-3-cyclohexylpropanoate in the form of its methobromide salt, M. P. 160–161° C.

*Analysis.*—Calcd. for $C_{22}H_{36}O_3NBr$: C, 59.71; H, 8.20; Br, 18.07. Found: C, 59.85; H, 8.44; Br, 18.14.

2-diethylaminoethyl 2-phenyl-3-hydroxy-3-cyclohexylpropanoate methobromide was found to have an antispasmodic activity about 44% that of atropine sulfate when tested by the modified Magnus method. The intravenous $ALD_{50}$ value in mice was 8 mg./kg.

EXAMPLE 2

(a) 2-phenyl-3-hydroxy-3-($\Delta^3$-cyclohexenyl)propanoic acid was prepared from isopropylmagnesium chloride, phenylacetic acid and $\Delta^3$-cyclohexenecarboxaldehyde according to the manipulative procedure described above in Example 1, part (a). The 2-phenyl-3-hydroxy-3-($\Delta^3$-cyclohexenyl)propanoic acid was obtained in 61% yield and had the M. P. 128–131° C. when recrystallized from carbon tetrachloride.

*Analysis.*—Calcd. for $C_{15}H_{18}O_3$: C, 73.14; H, 7.37. Found: C, 73.11; H, 7.31.

Neut. equiv. calcd.: 246.3. Found: 247.0.

(b) 2 - diethylaminoethyl 2-phenyl - 3 - hydroxy - 3 - (Δ³-cyclohexenyl)-propanoate

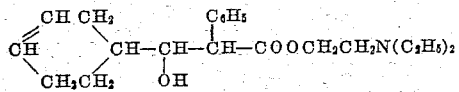

was prepared from 2 - phenyl - 3 - hydroxy - 3 - (Δ³-cyclohexenyl)propanoic acid and 2-diethylaminoethyl chloride according to the manipulative procedure described above in Example 1, part (b), except that the reaction mixture was refluxed only four hours and the solvents were then removed completely. After the addition of 20 cc. of acetone to the residue, and filtration, ether was added until the solution became cloudy. The hydrochloride salt of 2-diethylaminoethyl 2-phenyl-3-hydroxy-3-(Δ³-cyclohexenyl)propanoate was obtained in 53% yield and had the M. P. 154.5–155.5° C. when recrystallized from an isopropyl alcohol-methyl ethyl ketone mixture.

Analysis.—Calcd. for $C_{21}H_{32}O_3NCl$: C, 66.06; H, 8.44; Cl, 9.23. Found: C, 66.27; H, 8.63; Cl, 9.17.

2 - diethylaminoethyl 2 - phenyl - 3 - hydroxy - 3 - (Δ³-cyclohexenyl)propanoate hydrochloride was found to have an antispasmodic activity about 15% that of atropine sulfate when tested by the modified Magnus method.

The methobromide salt of 2-diethylaminoethyl 2-phenyl-3-hydroxy-3-(Δ³-cyclohexenyl) propanoate had the M. P. 157–158° C. when recrystallized from an isopropyl alcohol-ether mixture.

Analysis.—Calcd. for $C_{22}H_{34}O_3NBr$: C, 59.00; H, 7.57; Br, 18.74. Found: C, 60.11; H, 7.56; Br, 18.77.

2 - diethylaminoethyl 2 - phenyl - 3 - hydroxy - 3 - (Δ³-cyclohexenyl)propanoate methobromide was found to have an antispasmodic activity about 28% that of atropine sulfate when tested by the modified Magnus method. The intravenous $ALD_{50}$ value in mice was 9 mg./kg.

EXAMPLE 3

(a) 2 - phenyl - 3 - hydroxy - 3 - cyclopentylpropanoic acid was prepared from isopropylmagnesium chloride, phenylacetic acid and cyclopentanecarboxaldehyde according to the manipulative procedure described above in Example 1, part (a). The 2-phenyl-3-hydroxy-3-cyclopentylpropanoic acid was obtained in 75% yield and had the M. P. 145–148° C. when recrystallized from toluene.

Analysis.—Calcd. for $C_{14}H_{18}O_3$: C, 71.77; H, 7.74. Found: C, 71.70; H, 7.74.

Neut. equiv. calcd.: 234.3. Found: 235.1.

(b) 2 - diethylaminoethyl 2 - phenyl - 3 - hydroxy - 3 - cyclopentylpropanoate

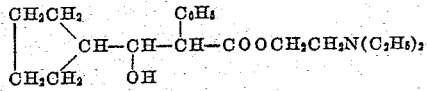

was prepared from 2-phenyl-3-hydroxy-3-cyclopentylpropanoic acid and 2-diethylaminoethyl chloride according to the manipulative procedure described above in Example 1, part (b). The hydrochloride salt of 2-diethylaminoethyl 2 - phenyl - 3 - hydroxy - 3 - cyclopentylpropanoate was obtained in 61% yield and had the M. P. 153–154° C. when recrystallized from an isopropyl alcohol-ether mixture.

Analysis.—Calcd. for $C_{20}H_{32}O_3NCl$: C, 64.94; H, 8.72; Cl, 9.58. Found: C, 64.96; H, 9.02; Cl, 9.54.

2 - diethylaminoethyl 2 - phenyl - 3 - hydroxy - 3 - cyclopentylpropanoate hydrochloride was found to have an antispasmodic activity about 31% that of atropine sulfate when tested by the modified Magnus method.

The methobromide salt of 2 - diethylaminoethyl 2-phenyl-3-hydroxy-3-cyclopentylpropanoate had the M. P. 126–128° C. when recrystallized from an isopropyl alcohol-ether mixture.

Analysis.—Calcd. for $C_{21}H_{34}O_3NBr$: C, 58.88; H, 8.00; Br, 18.65. Found: C, 58.84; H, 8.14; Br, 18.76.

2 - diethylaminoethyl 2 - phenyl - 3 - hydroxy - 3 - cyclopentylpropanoate methobromide was found to have an antispasmodic activity about 62% that of atropine sulfate when tested by the modified Magnus method. The intravenous $ALD_{50}$ value in mice was 6 mg./kg.

EXAMPLE 4

(a) 2 - phenyl - 3 hydroxy - 3 - (Δ¹ - cyclopentenyl)-propanoic acid was prepared from isopropylmagnesium chloride, phenylacetic acid and Δ¹-cyclopentenecarboxaldehyde according to the manipulative procedure described above in Example 1, part (a). The 2-phenyl-3-hydroxy-3 - (Δ¹ - cyclopentenyl)propanoic acid was obtained in 75% yield and had the M. P. 147–149° C. when recrystallized from benzene.

Analysis.—Calcd. for $C_{14}H_{16}O_3$: C, 72.39; H, 6.94. Found: C, 72.32; H, 7.05.

Neut. equiv. calcd.: 232.3. Found: 231.7.

(b) 2 - diethylaminoethyl 2 - phenyl - 3 - hydroxy-3-(Δ¹-cyclopentenyl)propanoate

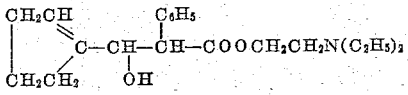

was prepared from 2-phenyl-3-hydroxy-3-(Δ¹-cyclopentenyl)propanoic acid and 2-diethylaminoethyl chloride according to the manipulative procedure described above in Example 1, part (b). The hydrochloride salt of 2-diethylaminoethyl 2 - phenyl - 3 - hydroxy - 3 - (Δ¹ - cyclopentenyl)propanoate was obtained in 56% yield and had the M. P. 129–132° C. (dec.) when recrystallized from methyl ethyl ketone.

Analysis.—Calcd. for $C_{20}H_{30}O_3NCl$: C, 65.29; H, 8.22; Cl, 9.64. Found: C, 65.10; H, 8.28; Cl, 9.76.

2 - diethylaminoethyl 2 - phenyl - 3 - hydroxy - 3 - (Δ¹-cyclopentenyl)propanoate hydrochloride was found to have an antispasmodic activity about 23% that of atropine sulfate when tested by the modified Magnus method.

The methobromide salt of 2-diethylaminoethyl 2-phenyl-3-hydroxy-3-(Δ¹-cyclopentenyl)propanoate had the M. P. 134–138° C. (dec.) when recrystallized from an acetone-ether mixture.

Analysis.—Calcd. for $C_{21}H_{32}O_3NBr$: C, 59.15; H, 7.57; Br, 18.74. Found: C, 59.18; H, 7.56; Br, 18.77.

2 - diethylaminoethyl 2 - phenyl - 3 - hydroxy - 3 - (Δ¹-cyclopentenyl)propanoate methobromide was found to have an antispasmodic activity about 62% that of atropine sulfate when tested by the modified Magnus method. The intravenous $ALD_{50}$ value in mice was 12 mg./kg.

It will be apparent from the foregoing and from the art that the aryl substituent of the acid moiety can be any of the aryl groups known to be applicable in this type of compound. A preferred class of aryl radicals comprises carbocyclic aromatic radicals having from one to two rings, thienyl radicals and alkylated thienyl radicals. The aryl group, when a carbocyclic aromatic radical of 1–2 rings, is a radical of the benzene, naphthalene or biphenyl series, preferably having less than about fifteen carbon atoms. The aromatic nucleus can be unsubstituted, or it can be substituted by one or more substituents, which however must be inert toward the reagents used in the synthesis of the compounds, in particular toward organometallic compounds. Thus the substituents can include such substituents as lower-alkyl, lower-alkoxy and lower-alkylmercapto radicals but not carboxy, cyano, hydroxy, primary amino and secondary amino radicals. On this basis, a preferred class of aryl radicals for the invention consists of unsubstituted phenyl, naphthyl and biphenyl radicals, and such radicals substituted by from one to three substituents selected from the class consisting of lower-alkyl groups having from 1 to about 6 carbon atoms, lower-alkoxy groups having from 1 to about 6 carbon atoms and lower-alkylmercapto groups having from 1 to 6 carbon atoms. Furthermore, said substituents can be in any of the available positions of the aromatic nucleus and where more than one, can be the same or different. The aryl group can therefore represent such groups as phenyl, p-tolyl, m-methoxyphenyl, 3,4-dimethoxyphenyl, p-methylmercaptophenyl, p-xenyl, 1-naphthyl, 2-naphthyl, 2-thienyl, 3-thienyl, 3-methyl-2-thienyl, 3,4-dimethyl-2-thienyl, and the like.

Similarly it will be apparent from the foregoing and from the art that the tertiary-amino portion of the molecule can be any of the known radicals of the aliphatic or cycloaliphatic type and includes di-lower-alkylamino, polymethylenimino and morpholino radicals. The alkyl groups of the di-lower-alkylamino radicals can be the same or different and each has less than about eight carbon atoms, the di-lower-alkylamino radicals thus including such groups as dimethylamino, diethylamino, methylethylamino, dipropylamino, diisopropylamino, dibutylamino, dipentylamino, dihexylamino, diheptylamino, and the like. The polymethylenimino radicals are simply cases where the alkyl groups of the di-lower-alkylamino groups are joined to produce a heterocyclic ring. The rings are 5- to 8-membered and thus include pyrrolidino, piperidino, hexamethylenimino and heptamethylenimino radicals and lower-alkylated derivatives thereof.

The lower-alkylene group joining the tertiary-amino group and the acid moiety preferably has from 2 to about 5 carbon atoms and thus includes the straight chain polymethylene radicals, $(CH_2)_n$, and branched chain isomers thereof.

These new alkamine esters are most conveniently used in the form of water-soluble acid-addition or quaternary ammonium salts, and these salts are within the purview of the invention. The acids which can be used to prepare acid-addition salts are those which produce when combined with the basic esters, salts whose anions are relatively innocuous to the animal organism in therapeutic doses of the salts, so that the beneficial physiological properties inherent in the basic esters are not vitiated by side-effects ascribed to the anions. Appropriate acid-addition salts are those derived from mineral acids such as hydrochloric acid, hydrobromic acid, hydriodic acid and sulfuric acid; and organic acids such as acetic acid, citric acid and tartaric acid. The quaternary ammonium derivatives are obtained by the addition of alkyl, alkenyl or aralkyl esters of inorganic acids or organic sulfonic acids, including such compounds as methyl chloride, methyl bromide, methyl iodide, ethyl bromide, propyl chloride, benzyl chloride, benzyl bromide, methyl sulfate, methyl benzene-sulfonate and methyl p-toluenesulfonate.

According to the procedures described in the preceding examples, and using the appropriate starting materials and reagents, the following compounds can be prepared: 3-dimethylaminopropyl 2-phenyl-3-hydroxy - 3 - cyclohexylpropanoate, 2-(methylethylamino)ethyl 2-phenyl-3-hydroxy - 3 - cyclohexylpropanoate, 2 - dibutylaminoethyl 2-phenyl - 3 - hydroxy - 3 - cyclohexypropanoate, 2-(1 - piperidyl)ethyl 2-phenyl - 3 - hydroxy - 3 - cyclohexylpropanoate, 2 - (1 - pyrrolidyl)ethyl 2 - phenyl - 3 - hydroxy - 3 - cyclohexylpropanoate, 2-(4-morpholinyl)-ethyl 2 - phenyl - 3 - hydroxy - 3 - cyclohexylpropanoate, 2-diethylaminoethyl 2 - (p-tolyl) - 3 - hydroxy - 3 - cyclohexylpropanoate, 2 - diethylaminoethyl 2 - (p-methoxyphenyl) - 3 - hydroxy - 3 - cyclohexylpropanoate, 2-diethylaminoethyl 2 - (p-methylmercaptophenyl) - 3 - hydroxy - 3 - cyclohexylpropanoate, 2 - diethylaminoethyl 2 - (2 - thienyl)-3 - hydroxy - 3 -cyclohexylpropanoate, 2-diethylaminoethyl 2 - (1 - naphthyl) - 3 - hydroxy - 3 - cyclohexylpropanoate, 2 - diethylaminoethyl 2 - (p-xenyl) - 3 - hydroxy - 3 - cyclohexylpropanoate, 2-diethylaminoethyl 2 - phenyl - 3 - hydroxy - 3 - ($\Delta^1$-cyclohexenyl)propanoate, 2 - diethylaminoethyl 2- phenyl - 3 - hydroxy - 3 - ($\Delta^2$-cyclopentenyl)propanoate, and the like .

The compounds of my invention can be prepared for use as antispasmodic agents in the same way as other natural or synthetic antispasmodics such as atropine sulfate, adiphenine hydrochloride, and the like.

I claim:
1. A compound selected from the group consisting of (A) tertiary-amino-lower-alkyl esters of 2-aryl-3-hydroxypropanoic acids substituted in the 3-position by a radical selected from the group consisting of cycloalkyl and cycloalkenyl having from 5 to 6 ring members; (B) acid-addition salts thereof; and (C) quaternary ammonium salts thereof.

2. A di-lower-alkylamino-lower-alkyl ester of 2-phenyl-3-hydroxy-3-cyclohexylpropanoic acid.

3. A di-lower-alkylamino-lower-alkyl ester of 2-phenyl-3-hydroxy-3-cyclohexenylpropanoic acid.

4. A di-lower-alkylamino-lower-alkyl ester of 2-phenyl-3-hydroxy-3-cyclopentylpropanoic acid.

5. A di-lower-alkylamino-lower-alkyl ester of 2-phenyl-3-hydroxy-3-cyclopentenylpropanoic acid.

6. 2 - diethylaminoethyl 2 - phenyl - 3-hydroxy-3-cyclohexylpropanoate.

7. 2-diethylaminoethyl 2-phenyl-3-hydroxy-3-($\Delta^3$-cyclohexenyl)propanoate.

8. 2 - diethylaminoethyl 2 - phenyl - 3-hydroxy-3-cyclopentylpropanoate.

9. 2-diethylaminoethyl 2-phenyl-3-hydroxy-3-($\Delta^1$-cyclopentenyl)propanoate.

10. The process for the preparation of a tertiary-amino-lower-alkyl ester of a 2-aryl-3-hydroxypropanoic acid substituted in the 3-position by a radical selected from the group consisting of cycloalkyl and cycloalkenyl having from 5 to 6 ring members, which comprises reacting the halomagnesium derivative of a salt of an arylacetic acid with a member of the group consisting of cycloalkanecarboxaldehydes and cycloalkenecarboxaldehydes in an inert solvent at a temperature between about 20° C. and 100° C., hydrolyzing the reaction mixture with dilute mineral acid, and reacting the resulting 2-aryl-3-hydroxy-3-(cycloalkyl or cycloalkenyl) propanoic acid with a tertiary-amino-lower-alkyl halide in an inert solvent at a temperature between about 50° C. and 150° C.

11. The process for the preparation of a di-lower-alkylamino-lower-alkyl ester of 2-phenyl-3-hydroxy-3-cyclohexylpropanoic acid which comprises reacting the halomagnesium derivative of a salt of phenyl-acetic acid with cyclohexanecarboxaldehyde in an inert solvent at a temperature between about 20° C. and 100° C., hydrolyzing the reaction mixture with dilute mineral acid, and reacting the resulting 2-phenyl-3-hydroxy-3-cyclohexylpropanoic acid with a di-lower-alkylamino-lower-alkyl halide in an inert solvent at a temperature between about 50° C. and 150° C.

12. The process for the preparation of a di-lower-alkylamino-lower-alkyl ester of 2-phenyl-3-hydroxy-3-cyclohexenylpropanoic acid which comprises reacting the halomagnesium derivative of a salt of phenylacetic acid with a cyclohexenylcarboxaldehyde in an inert solvent at a temperature between about 20° C. and 100° C., hydrolyzing the reaction mixture with dilute mineral acid, and reacting the resulting 2-phenyl-3-hydroxy-3-cyclohexenylpropanoic acid with a di-lower-alkylamino-lower-alkyl halide in an inert solvent at a temperature between about 50° C. and 150° C.

13. The process for the preparation of a di-lower-alkylamino-lower-alkyl ester of 2-phenyl-3-hydroxy-3-cyclopentylpropanoic acid which comprises reacting the halomagnesium derivative of a salt of phenylacetic acid with cyclopentanecarboxaldehyde in an inert solvent at a temperature between about 20° C. and 100° C., hydrolyzing the reaction mixture with dilute mineral acid, and reacting the resulting 2-phenyl-3-hydroxy-3-cyclopentylpropanoic acid with a di-lower-alkylamino-lower-alkyl halide in an inert solvent at a temperature between about 50° C. and 150° C.

14. The process for the preparation of a di-lower-alkylamino-lower-alkyl ester of 2-phenyl-3-hydroxy-3-cyclopentenylpropanoic acid which comprises reacting the halomagnesium derivative of a salt of phenylacetic acid with a cyclopentenylcarboxaldehyde in an inert solvent at a temperature between about 20° C. and 100° C., hydrolyzing the reaction mixture with dilute mineral acid, and reacting the resulting 2-phenyl-3-hydroxy-3-cyclopentenylpropanoic acid with a di-lower-alkylamino-lower-alkyl halide in an inert solvent at a temperature between about 50° C. and 150° C.

15. The process for the preparation of 2-diethylaminoethyl 2-phenyl-3-hydroxy-3-cyclohexylpropanoate which comprises reacting the halomagnesium derivative of a salt of phenylacetic acid with cyclohexanecarboxaldehyde in an inert solvent at a temperature between about 20° C. and 100° C., hydrolyzing the reaction mixture with dilute mineral acid, and reacting the resulting 2-phenyl-3-hydroxy-3-cyclohexylpropanoic acid with 2-diethylaminoethyl halide in an inert solvent at a temperature between about 50° C. and 150° C.

16. The process for the preparation of 2-diethylaminoethyl 2-phenyl-3-hydroxy-3-($\Delta^3$-cyclohexenyl)propanoate which comprises reacting the halomagnesium derivative of a salt of phenylacetic acid with $\Delta^3$-cyclohexenecarboxaldehyde in an inert solvent at a temperature between about 20° C. and 100° C., hydrolyzing the reaction mixture with dilute mineral acid, and reacting the resulting 2-phenyl-3-hydroxy-3-($\Delta^3$-cyclohexenyl)-propanoic acid with 2-diethylaminoethyl halide in an inert solvent at a temperature between about 50° C. and 150° C.

17. The process for the preparation of 2-diethylaminoethyl 2-phenyl-3-hydroxy-3-cyclopentylpropanoate which comprises reacting the halomagnesium derivative of a salt of phenylacetic acid with cyclopentanecarboxaldehyde in an inert solvent at a temperature between about 20° C. and 100° C., hydrolyzing the reaction mixture with dilute mineral acid, and reacting the resulting 2-phenyl-3-hydroxy-3-cyclopentylpropanoic acid with 2-diethylaminoethyl halide in an inert solvent at a temperature between about 50° C. and 150° C.

18. The process for the preparation of 2-diethylaminoethyl 2-phenyl-3-hydroxy-3-($\Delta^1$-cyclopentenyl)propanoate which comprises reacting the halomagnesium derivative of a salt of phenylacetic acid with $\Delta^1$-cyclopentenecarboxaldehyde in an inert solvent at a temperature between about 20° C. and 100° C., hydrolyzing the reaction mixture with dilute mineral acid, and reacting the resulting 2-phenyl-3-hydroxy-3-($\Delta^1$-cyclopentenyl)-propanoic acid with 2-diethylaminoethyl halide in an inert solvent at a temperature between about 50° C. and 150° C.

References Cited in the file of this patent

UNITED STATES PATENTS

| | | |
|---|---|---|
| 2,490,964 | Hoffmann et al. | Dec. 13, 1949 |
| 2,554,511 | Treves | May 29, 1951 |
| 2,558,020 | Treves | June 26, 1951 |

OTHER REFERENCES

Blicke et al.: J. Am. Chem. Soc., 77, 6247–8 (1955).